US012563274B2

(12) United States Patent
Xu et al.

(10) Patent No.: US 12,563,274 B2
(45) Date of Patent: Feb. 24, 2026

(54) METHODS AND SYSTEMS FOR GENERATING A THUMBNAIL

(71) Applicant: Adeia Guides Inc., San Jose, CA (US)

(72) Inventors: Ning Xu, Irvine, CA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/520,892

(22) Filed: Nov. 28, 2023

(65) Prior Publication Data

US 2025/0175683 A1 May 29, 2025

(51) Int. Cl.
H04N 21/854 (2011.01)
H04N 21/442 (2011.01)

(52) U.S. Cl.
CPC ..... *H04N 21/854* (2013.01); *H04N 21/44204* (2013.01)

(58) Field of Classification Search
CPC ....................... H04N 21/854; H04N 21/44204
See application file for complete search history.

(56) References Cited

U.S. PATENT DOCUMENTS

| 7,251,790 B1 * | 7/2007 | Drucker | G06F 16/743 |
| | | | 707/E17.119 |
| 2013/0304587 A1 * | 11/2013 | Ralston | G06Q 30/0275 |
| | | | 705/14.67 |
| 2014/0074759 A1 * | 3/2014 | Lewis | G06F 16/743 |
| | | | 706/12 |
| 2021/0274255 A1 * | 9/2021 | Aher | H04N 21/4622 |

OTHER PUBLICATIONS

"How Netflix Uses Matching to Pick the Best Thumbnail for You", (Networks Course blog for Info 2040/CS 2850/Econ 2040/SOC 2090),(https://blogs.cornell.edu/info2040/2022/09/28/how-netflix-uses-matching-to-pick-the-best-thumbnail-for-you/),(1 page).
Adam Hayes, "YouTube Stats: Everything You Need to Know in 2024!",(Wyzowl),(https://www.wyzowl.com/youtube-stats/),(8 pages).
Alina Zahid Khan, Govisually, "Thumbnail Artwork: How It's Helping Million Dollar Businesses" (https://govisually.com/blog/thumbnail-artwork/#How_Does_Netflix_Select_Thumbnails), (6 pages).
Eepsa Mittal, "6 Reasons Why YouTube Thumbnails are Important for Traffic", (Published in The Video Marketers Playbook, May 24, 2018),(Medium),(https://medium.com/p/4cb5dab94e1),(5 pages).
Justin Diaz, "YouTube is testing multiple thumbnails for content creators",(Jun. 23, 2023),(Android Headlines),(https://www.androidheadlines.com/2023/06/youtube-testing-multiple-video-thumbnails-creators.html),(3 pages).
Looper, "The Secret Behind Netflix's Personalized Thumbnails", (https://www.looper.com/274997/the-secret-behind-netflixs-personalized-thumbnails/).
Ryan Knott, "What Are Video Thumbnails and Why Do They Matter?", (TechSmith),(https://www.techsmith.com/blog/what-are-video-thumbnails/),(8 pages).

* cited by examiner

*Primary Examiner* — Sumaiya A Chowdhury
(74) *Attorney, Agent, or Firm* — HG Law LLP

(57) ABSTRACT

System and methods are provided relating to generation of a thumbnail. Display elements for use in a first thumbnail are stored in a database. Metadata relating to the display elements is determined. A contextual parameter relating to a current viewing session is determined. A first display element is selected for use in generating the first thumbnail based on the metadata and the contextual parameter. The first thumbnail comprising the first display element is caused to be displayed at a user device.

16 Claims, 7 Drawing Sheets

Fig. 3

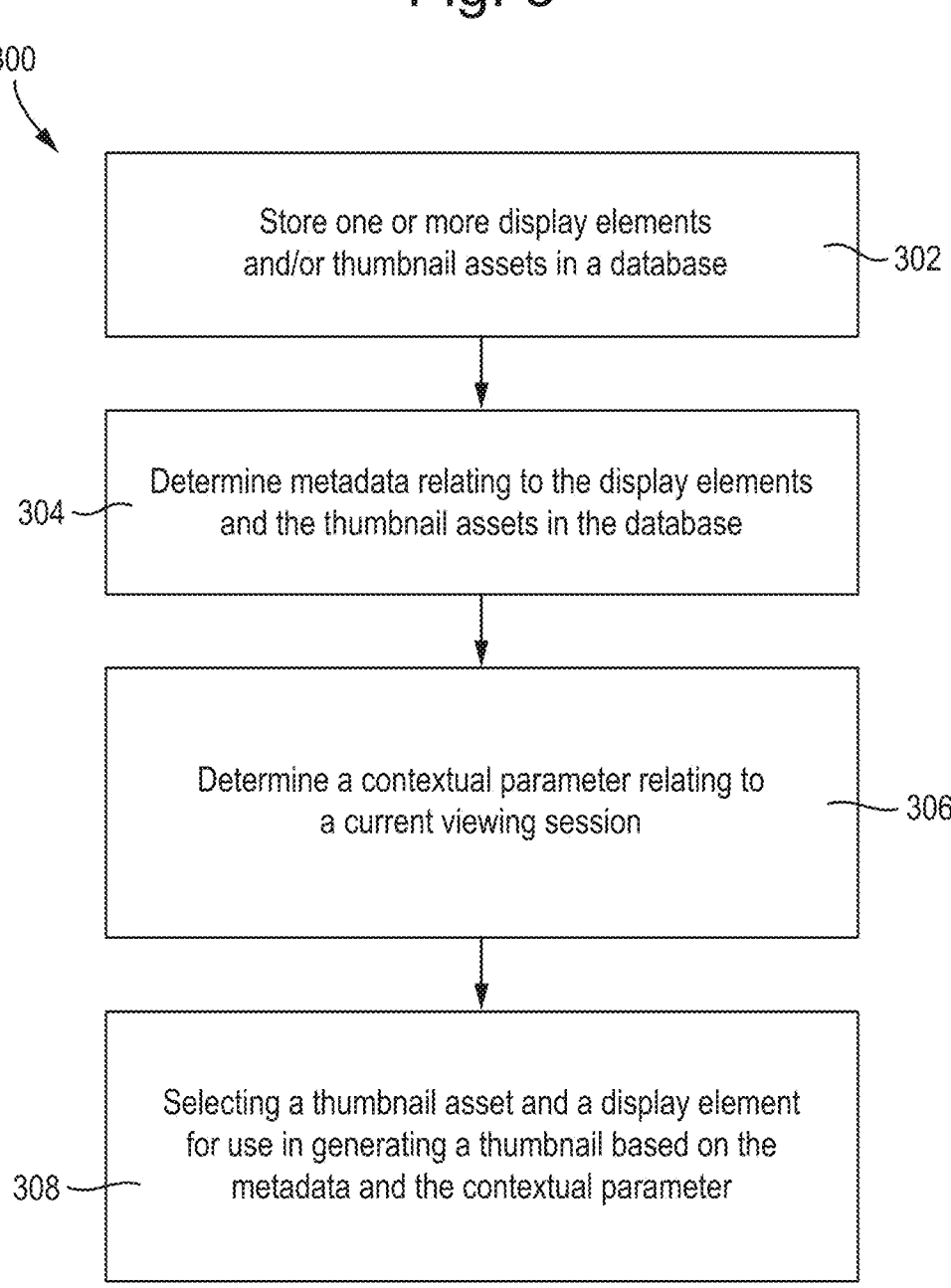

300

Store one or more display elements
and/or thumbnail assets in a database — 302

Determine metadata relating to the display elements
and the thumbnail assets in the database

304

Determine a contextual parameter relating to
a current viewing session — 306

Selecting a thumbnail asset and a display element
for use in generating a thumbnail based on the
metadata and the contextual parameter

308

METHODS AND SYSTEMS FOR GENERATING A THUMBNAIL

BACKGROUND

The present disclosure relates to methods and systems for generating a thumbnail. Particularly, but not exclusively, the present disclosure relates to methods and systems for dynamically generating and/or updating a thumbnail by inserting one or more display elements into the thumbnail during a current viewing session of the thumbnail.

SUMMARY

At a high level, a thumbnail is a representation of a media content item and usually the first impression of that media content item. As such, it is important for content creators, content owners, and streaming services to make their thumbnails as representative and engaging as possible, as a click-through rate associated with the thumbnail can influence operational demands of a content provider. In one approach, content platforms, such as platforms for hosting user-generated content (UGC), allow for presentation of a single thumbnail representing the media content. However, such an approach offers no flexibility accounting for differences in viewer interest, behavior, and context. In another approach, a thumbnail for a media content item may be generated or selected based on visual analysis of the media content item. For example, a frame of the media content or artwork related to the media content item may be selected as the thumbnail, e.g., automatically, based on an aesthetic parameter of the frame and a user profile. However, such an approach still results in a static thumbnail.

Systems and methods are provided herein for improving how a thumbnail is generated. For example, the systems and methods disclosed herein provide a means for generating and/or updating, e.g., in real time, a thumbnail during a current viewing session. In this manner, the thumbnail can adapt to external factors like the viewing environment of the viewing session and/or a characteristic of surrounding thumbnails, e.g., to enhance user engagement and help control a click-through rate associated with the thumbnail. In some examples, a current viewing session may involve a user searching for content items, a user scrolling through a list of content items, such as UGC on a video sharing platform or movies/shows in a program guide associated with a service provider or a streaming service. The systems and methods provided herein may dynamically change one or more display elements (e.g., a foreground component, a background component, a text component, etc.) in a thumbnail based on a contextual parameter relating to the current viewing session. For example, a contextual parameter may relate to an environment in which a selection of content items is being viewed, a behavioral pattern of the viewer, a technical parameter of a user device presenting the selection of content items, or other data, such as time, location, the appearance of adjacent content items, etc. For the avoidance of doubt, in the context of the present disclosure, when referring to "the generation of a thumbnail" or "thumbnail generation", the generated thumbnail may be a completely new thumbnail or an updated version of an existing thumbnail, e.g., a version of a thumbnail that is already displayed during a current viewing session.

In some examples, a current viewing session may have a starting time corresponding to a time when an application is initiated or opened. For example, when a user opens an application on a user device, the current viewing session may start from the time at which the user opens, or otherwise initiates/selects, the application for use, e.g., when initially browsing content for viewing. Such an approach allows for a one or more thumbnails to be generated as the application is initiated, e.g., before a user starts browsing content. In some examples, the current viewing session may start from the time at which a user selects for use a profile of an already open application. Such an approach allows for a one or more thumbnails to be generated as the user profile is selected, e.g., before a user starts browsing content on their profile. In some examples, the current viewing session may have a stating time corresponding to a time when a user starts engaging an application in current use. For example, an application may have previously been opened for use by a user, before the user switches to use a different application. Such an approach allows for a one or more thumbnails to be updated as the use of the application resumes.

According to aspects of the present disclosure, systems and methods are provided for generating a (first) thumbnail, e.g., for display on a user interface, during a current viewing session. In some examples, the thumbnail may be a new thumbnail, e.g., a thumbnail that has not previously existed. In some examples, the thumbnail may be an updated version of an existing thumbnail, e.g., an updated version of a stock thumbnail provided by a content provider.

In some examples, one or more display element are stored in a database. For example, a database may be updated by creating an additional record storing a display element. Metadata relating to the display element may be stored concurrently in the database. In some examples, the database may be populated manually, e.g., by a user uploading one or more display elements to the database. In some examples, the database may be updated automatically, e.g., based on metadata relating to the content item.

In some examples, a new database, e.g., a new data structure, may be generated in response to receiving media content for distribution. For example, the new database may be a database associated with the received media content and for storing one or more display elements related to that media content. In some examples, the database may be generated automatically, e.g., based on metadata relating to the content item. In some examples, a new database that specific to a user account may be generated, e.g., in response to receiving a user request for storing a display element. In some examples, a display element comprises an image, text, an icon, an object, a link and/or an interactive element.

In some examples, one or more thumbnail assets are stored in a database. For example, a database may be updated by creating an additional records associated with and representing the thumbnail assets. Metadata relating to the thumbnail assets may be stored concurrently in the database.

In some examples, a database of thumbnail assets is generated. For example, the database may be generated automatically, e.g., based on metadata relating to the content item. Additionally or alternatively, the database may be generated manually, e.g., by a user uploading one or more thumbnail assets to the database. In some examples, a thumbnail asset comprises an image, a frame of a media content item, a background, etc. In some examples, the thumbnail asset comprises a container or template for generation of a thumbnail. In some examples, a display element may be configured to be inserted into or overlaid onto a thumbnail asset, thereby defining a thumbnail, e.g., for display on a user interface.

In some examples, metadata relating to the display elements and/or the thumbnail assets is determined. In some examples, the metadata may be automatically determined, e.g., based on analysis of the display elements and/or the thumbnail assets. In some examples, the metadata may be automatically determined, e.g., based on metadata relating to a media content item, e.g., the received media content item. In some examples, a display element may be extracted from a thumbnail asset. When a display element is extracted from a thumbnail asset, the display element may retain metadata associated with the thumbnail asset from which it is extracted. In some examples, metadata relating to the display elements and/or the thumbnail assets may be determined based on metadata for one or more existing thumbnails relating to the received content item. For example, a thumbnail asset and/or a display element may be extracted from an existing thumbnail for use in generating a new thumbnail or updated version of an existing thumbnail.

In some examples, a contextual parameter relating to a current, e.g., real time, viewing session is determined. A contextual parameter may include a user viewing pattern, e.g., gaze tracking and scrolling rate, an historic selection of other thumbnails, a visual variance of multiple thumbnails on a screen, etc.

In some examples, a display element, e.g., a first display element, is selected for use in generating the first thumbnail, e.g., based on the metadata and the contextual parameter. In some examples, a thumbnail asset, e.g., a first thumbnail asset, is selected for use in generating the first thumbnail, e.g., based on the metadata and the contextual parameter. In some examples, the display element and the thumbnail asset, in combination, define a thumbnail. In some examples, the thumbnail is generated for presentation at a user device.

In some examples, a score, e.g., a ranking or weight, for a display element and/or a thumbnail asset is determined, e.g., based on the metadata and a system setting, e.g., a user preference of a viewer in the current viewing session or a setting in a user profile for a viewer in the current viewing session. In some examples, the metadata for a display element and/or a thumbnail asset is compared to the system setting (e.g., a user profile setting) to determine a match or correlation between the display element and/or a thumbnail asset.

In some examples, a likelihood of a user interaction with a display element is determined based on the score and the contextual parameter. In some examples, a display element is selected for use in generating a thumbnail based on the likelihood of the user interaction. In some examples, a likelihood of a user interaction with the thumbnail, once generated for display, is determined based on the score and the contextual parameter.

In some examples, a user interaction with the thumbnail having the display element is determined or monitored. In some examples, the score for a display element is updated based on the user interaction, e.g., providing a feedback mechanism for the score relating to a display element. In some examples, a level of user interaction is determined. The level of user interaction may be compared to an interaction value, e.g., an interaction threshold. In some examples, in response to the level of user interaction being less than the interaction value, a new or updated contextual parameter is determined. In some examples, in response to the level of user interaction being less than the interaction value, a different display element, e.g., a second display element, is selected for use in generation of the thumbnail. In some examples, a first display element is replaced with the second display element, e.g., during the current viewing session. In some examples, the score of the first display element is reduced to a score below a score of the second display element, e.g., based on its replacement by the second display element. In some examples, the second display element may be selected for use in generation of a thumbnail during a subsequent viewing session, e.g., instead of the first display element.

In some examples, a bid relating to use of a display element in a thumbnail is received. In some examples, a display element is selected for use based on the bid. In some examples, the selected display element may be received from a source, such as a third party server, e.g., an ad server.

In some examples, a video is received. The video may be analyzed to generate one or more thumbnail assets. In some examples, one of the thumbnail assets is selected as a background for a thumbnail, e.g., based on a system setting, e.g., a user preference setting, cookies, user account data, and/or device data. Additionally or alternatively, one of the thumbnail assets may be selected as a background for a thumbnail, e.g., based on the contextual data, including but not limited to demographic data, geographic data, viewing history, user settings and preferences, device types and capabilities, current date and time, etc.

In some examples, determining the contextual parameter comprises determining a variance in a visual characteristic of thumbnails displayed on a user interface. The thumbnails may be adjacent thumbnails, or thumbnails dispersed over the user interface. In some examples, determining the contextual parameter comprises determining a gaze of a user participating in the current viewing session of a user interface. In some examples, determining the contextual parameter comprises determining a scrolling characteristic relating to the current viewing session of a user interface.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 is a flowchart representing a process for inserting a display element into a thumbnail, in accordance with some examples of the disclosure;

DETAILED DESCRIPTION

Systems and methods are provided herein for generating a thumbnail, e.g., by inserting one or more display elements into a thumbnail asset. In the context of the present disclosure, a thumbnail asset is understood to mean a file or template into which one or more display elements may be inserted to generate a thumbnail. For example, a thumbnail asset may be a base image or background image, such as a frame of a video, into which display elements, such as text, objects, images, animations, logos, icons, ads, links, and/or interactive elements may be inserted or overlaid. In some examples, a thumbnail asset may comprise a blank file or image forming a digital canvas for the generation of a thumbnail, e.g., by inserting or overlaying one or more display elements. In some examples, a thumbnail asset may have associated metadata describing the layout of the thumbnail asset (e.g., size, resolution, format, etc.), as well as one or more operations permissible to be performed on the thumbnail asset. Different layouts of the same thumbnail asset may exist for different device types (e.g., mobile devices, tablets, smart TVs, Augmented reality or smart glasses, etc.) A provider of a thumbnail asset may define one or more rules or settings relating to how the thumbnail asset may be used. Metadata may be provided for the display elements in a similar manner. In some examples, a thumbnail asset may comprise media content having one or more associated usage permissions, e.g., to restrict how, where and/or when the thumbnail asset may be used. In this manner, the thumbnail asset and display element, e.g., in combination, form a thumbnail. Each of the thumbnail asset and the display element may be changed or updated based on a contextual parameter relating to a current session in which the thumbnail is being viewed (or is about to be viewed).

Figure 1:
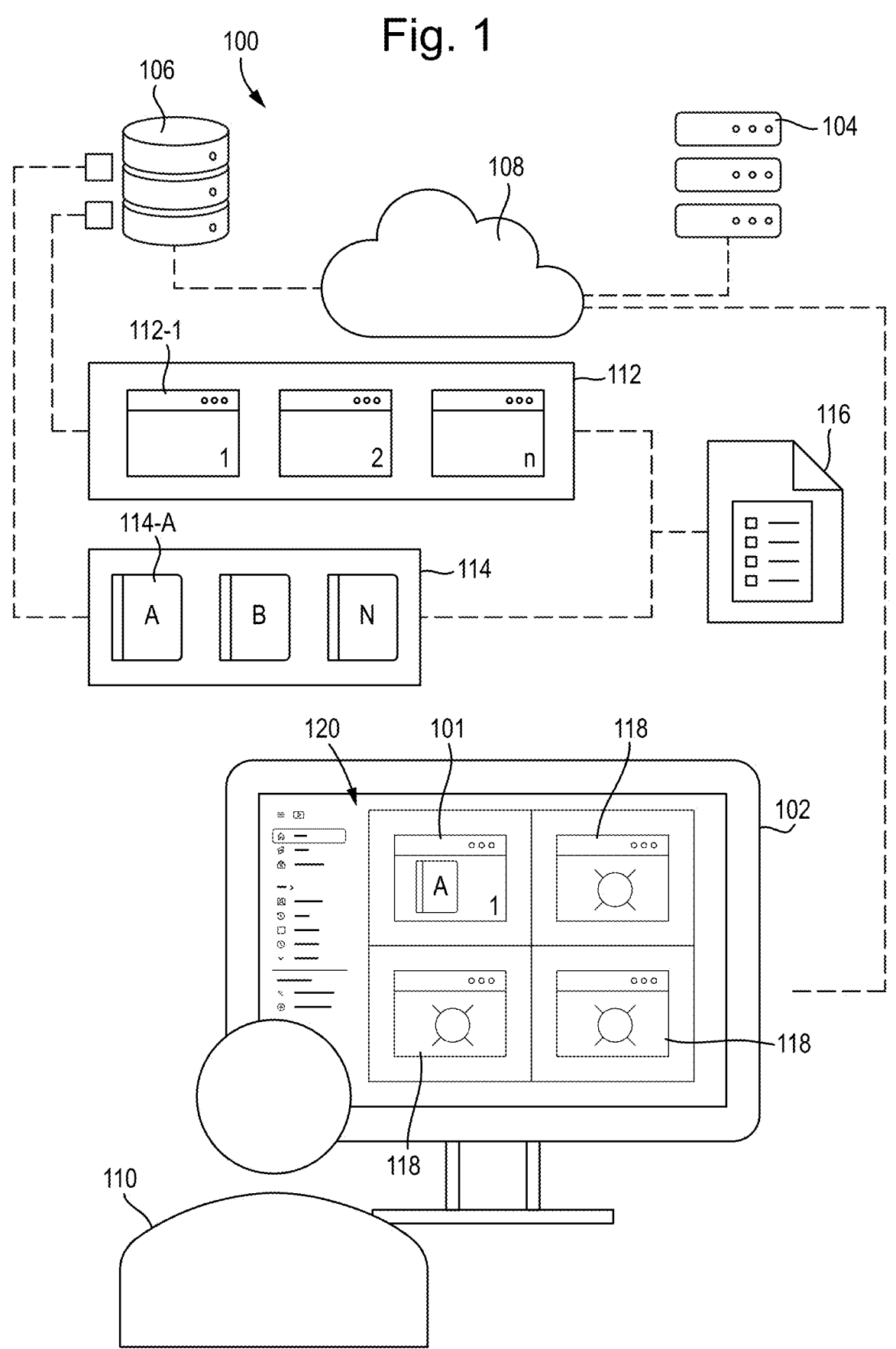
FIG. 1 illustrates an overview of the system for generating a thumbnail, in accordance with some examples of the disclosure.

FIG. 1 shows a system 100 for generating a thumbnail 101 for presentation to a user during a current viewing session. In the example shown in FIG. 1, user 110 is viewing a selection of thumbnails representing various media content items that are selectable for viewing on user device 102. The user device 102 may be any appropriate type of user device configured to display media content, and receive an input selecting a thumbnail for viewing content associated with the thumbnail. For example, the user device 102 may be a smart TV connected to server 104 and content database 106 by virtue of network 108 and application executing at least partially on the smart TV. Server 104 may be a server of a content provider, e.g., providing over-the-top (OTT) media content to user, or a platform for hosting UGC. Database 106 may store one or more content items accessible using user device 102, e.g., via a user account managed by server 104. In the example shown in FIG. 1, database 106 stores one or more thumbnail assets 112 and one or more display elements 114, together with metadata relating to the thumbnail assets 112 and the display elements 114. It will be appreciated that in other examples the media content, the thumbnail assets 112, the display elements 114 and the metadata 116 may be distributed amongst various databases an reside on various servers. In the example shown in FIG. 1, thumbnail 101 has been generated for presentation on user device 102, e.g., based on metadata 116 and one or more contextual parameters relating to the current viewing session. For example, a contextual parameter may include any parameter affecting how a thumbnail might be viewed and/or a likelihood of the thumbnail being selected, such as a variance in a visual appearance of one or more other thumbnails 118 being displayed, a viewing pattern of user 110 (e.g., a viewing history, a user preference, a thumbnail selection pattern, etc.), a scrolling characteristic of user 110 (e.g., a manner in which user 110 is controlling a display of the thumbnails, such as scrolling up-down, versus scrolling left-right), a type of user device 102 (e.g., which influences the size, number, resolution, etc. of the thumbnails displayed on user device 102), and/or any other appropriate parameter, such as a measure of user distraction or activity in an environment in which the current viewing session is occurring. The systems and methods provided herein are designed to compare and contrast the metadata with the one or more contextual parameters to generate, e.g., in real time, a thumbnail generated or modified specifically for the current viewing session. Such generation or modification may illicit improved user engagement with the thumbnail, which can drive operational efficiencies at server 104 and/or database 106, e.g., by helping to control a click-through rate of one or more displayed thumbnails. In the example shown in FIG. 1, user device 102 is displaying a user interface for a UGC sharing platform. The interface is displaying various thumbnails 101 and 118 during a current viewing session. In this example, thumbnails 118 are displaying generic content, e.g., content that is unmodified or adapted from an original version of the thumbnail. However, the content of thumbnail 101 has been generated based on the metadata 116 (from the thumbnail assets 112 and the display elements 114 stored in database 106) and a contextual parameter of the viewing session. For example, thumbnail 101 has been generated to include thumbnail asset 112-1 and display element 114-A. The generation of thumbnail 101 is described below in more detail, e.g., referring to the processes illustrated in FIGS. 3 and 4, which can be implemented on the system set out in FIG. 1 and/or FIG. 2.

Figure 2:
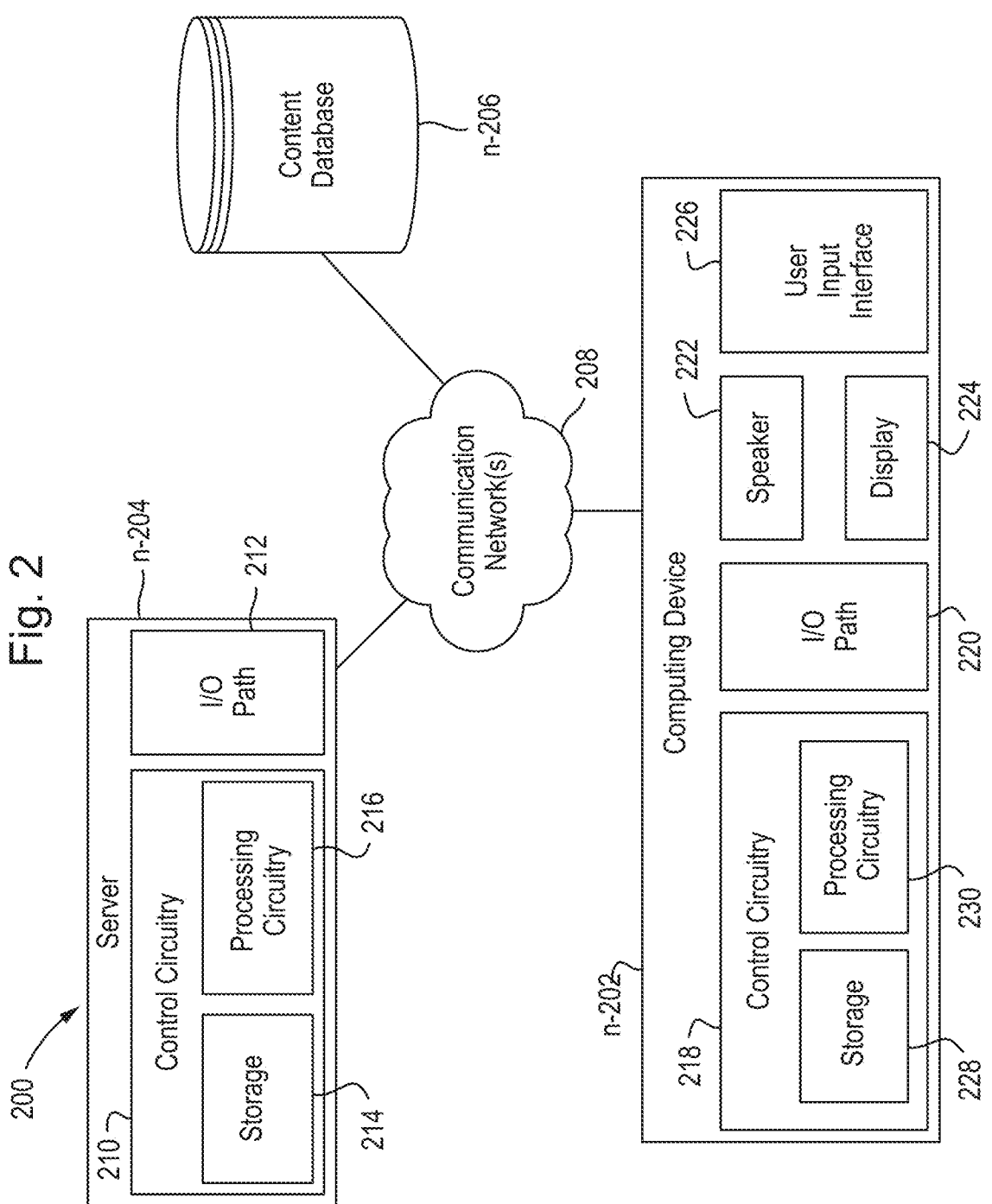
FIG. 2 is a block diagram showing components of an example system for generating a thumbnail, in accordance with some examples of the disclosure.

FIG. 2 is an illustrative block diagram showing example system 200, e.g., a non-transitory computer-readable medium, configured to generate and/or update one or more thumbnails, e.g., during a viewing session on a computing device, such as user device 102. Although FIG. 2 shows system 200 as including a number and configuration of individual components, in some examples, any number of the components of system 200 may be combined and/or integrated as one device, e.g., as user device 102. System 200 includes computing device n-202 (denoting any appropriate number of computing devices, such as user device 102), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks, such as network 108. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database n-206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to generate subtitles, to control circuitry 210 and/or 218 using user input interface 226. User input interface 226 may be any suitable user interface, such as a remote control, track-ball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

FIG. 3 shows a flowchart representing an illustrative process 300 for generating a thumbnail. While the example shown in FIG. 3 refers to the use of system 100, as shown in FIG. 1, it will be appreciated that the illustrative process 300 shown in FIG. 3 may be implemented, in whole or in part, on system 100, system 200, and/or any other appropriately configured system architecture. For the avoidance of doubt, the term "control circuitry" used in the below description applies broadly to the control circuitry outlined above with reference to FIG. 1 and/or FIG. 2. For example, control circuitry may comprise control circuitry of user device 102 and control circuitry of server 104, working either alone or in some combination.

At 302, control circuitry, e.g., control circuitry of server 104, updates (or creates) a database of thumbnail assets and display elements for use in generating a first thumbnail, e.g., thumbnail 101. In some examples, a database may be updated by storing one or more thumbnail assets and/or display elements in the database. In some examples, a new database is created to store one or more thumbnail assets and/or display elements. In some examples, the display elements 114 can be uploaded by a content creator. For example, the content creator can select one or more display elements 112 and/or thumbnail assets 114 for upload to database 106, e.g., when uploading a video for distribution over network 108. In such an example, the content creator can select various images or frames from the media content to be used as a background for a thumbnail. Using the example of a UGC platform, a user can upload a video for sharing on the platform. Separate to uploading the video, the user can select one or more images usable as a thumbnail asset, which can form a template for the insertion of one or more display elements when generating a thumbnail. For example, a user may select multiple frames as respective thumbnail assets that each represent a key moment within the video. Additionally or alternatively, other images may be selected or created for use as a thumbnail asset. For example, a user may select artwork or stock images for use as a thumbnail asset (given appropriate permission).

In some examples, control circuitry may generate automatically one or more thumbnail assets based on a media content item. For example, control circuitry may analyse a video to gain an understanding of the video content. In some examples, control circuitry may use video content analytics to detect and determine temporal and spatial events occurring in the video. Additionally or alternatively, control circuitry may use a large language model to analyse and determine the presence and content of subtitles in the media content item. Additionally or alternatively, control circuitry may use automatic speech recognition and speech-to-text techniques to obtain a text summary of the media content item. Using these analytics and techniques, control circuitry may automatically generate various thumbnail assets for use when generating a thumbnail. For example, a content provider may set one or more rules for the automatic extraction of key frames form a media content item, such as frames containing various types of content, e.g., a title, a type of scene (such as action, romance, etc.), a frame showing a specified actor or object, or any other appropriate type of content. In some examples, control circuitry may be configured to retrieve one or more images matching a person or object in a key frame of the media content item. For example, where an extracted key frame contains a particular actor, control circuitry may be configured to retrieve one or more images associated with that actor, such as a headshot of the actor, or a preselected image of the actor and/or artwork of the actor, for use as a thumbnail asset. A user uploading UGC may request automatic extraction of one or more key frames from an uploaded video. In the example shown in FIG. 1, database 106 contains a set of thumbnail assets labelled as 112-1, 112-2 to 112-n.

In a similar manner to the generation of a set of thumbnail assets, one or more display elements 114 may be added to database 106. For example, various display elements 114 such as text, objects, images, animations, icons, ads, links, and/or interactive elements may be added to database 106. The display elements 114 may be created by the content provider, or generated automatically based on the uploaded video. For example, a user may upload a text box containing a word or phrase summarizing the video or a specific thumbnail asset, such as "Stunning" or "Boring". Additionally or alternatively, control circuitry may be configured to provide a selectable field in which a user can enter text. For example, when uploading video content, control circuitry may prompt a user to enter text relating to various aspects of the video, such as title, content, etc. This text may be used as metadata for the video, from which metadata for a display element and/or a thumbnail asset may be derived (e.g., at 304 below). In some examples, a user may upload one or more variants of a display element 114. For example, a user may generate text in various languages, colors and/or fonts. In some examples, control circuitry may be configured to automatically create a variant of a display element 114. For example, where text has been uploaded as a display element 114, control circuitry may generate various versions of the text in different languages, colors and/or fonts. The same principles apply to other types of display elements 114, such as variants of an object, an image, an animation, an icons, an ad, a link, an interactive element, and/or any other type of display element 114.

In some examples, control circuitry may be configured to generate or retrieve one or more display elements 114 based on an image or key frame of the video. For example, control circuitry may be configured to generate text summarizing the content of the key frame. For example, one or more image recognition techniques may be used to identify an object or an individual in a keyframe, and generate or retrieve a display element 114 based on the identification. For example, should the key frame contain an image of the Eiffel Tower, control circuitry may generate or retrieve the text "Paris", or "Le Tour d'Eiffel", for example. In the example shown in FIG. 1, database 106 contains a set of display elements 114 labelled as 114-A, 114-B to 114-N.

At 304, control circuitry, e.g., control circuitry of server 104, determines metadata 116 relating to the thumbnail assets 112 and the display elements 114 in the database 106. The metadata 116 may be generated by the content provider and/or automatically by the control circuitry. The metadata 116 may contain any appropriate field to describe each thumbnail asset 112 and each display element 114. For example, the metadata 116 may contain fields relating to one or more of: a category (e.g., media content item title, synopsis, textbox, icon, link, animation, etc.); a description (e.g., a short description of the thumbnail asset 112 and/or display element 114); a targeted presentation group (e.g., including a targeted audience profile, preference, behavior, device, context, etc.); and a permission (e.g., describing how and when a thumbnail asset 112 and/or a thumbnail 114 can be used and/or modified).

In some examples, when the metadata 116 is generated by the content provider, the content provider can create, e.g., for use at 302, the metadata 116 for the thumbnail assets 112 and the display elements 114. For example, when the content is a movie, the content provider can provide metadata describing the movie, one or more key frames from the movie and one or more display elements 114 relating to the movie for use in generation of a thumbnail. In such an example, a set of metadata 116 may be locked or restricted from modification, e.g., to ensure that a description of the content remains accurate. In some examples, the metadata 116 may be generated automatically, e.g., based on one or more image processing techniques. For example, when the content is UGC, a user can provide the text "So Cool!" for insertion into a thumbnail. In such an example, control circuitry may use a large language model to recognize the text as being English phrase relating to a positive exclamation. Should control circuitry convert the text to another language, corresponding metadata may be added. In this manner, the metadata 116 relating to the thumbnail assets 114 and display elements 114 is stored for access when generating a thumbnail. In some examples, the metadata 116 may be uploaded to database 106 concurrently with an upload of a display element 114 to database 106.

At 306, control circuitry, e.g., control circuitry of user device 102 and/or server 104, determines one or more contextual parameters relating to a current viewing session. In the example shown in FIG. 1, the current viewing session is represented as user 110 viewing and operating the interface 120 shown on user device 102. In the context of the present disclosure, the term "viewing session" is understood to mean a time-based navigation through content displayed on user interface 120. As discussed above, a contextual parameter may relate to any factor that affects how a thumbnail may be represented and/or viewed on a user device 102. For example, a contextual parameter may relate to a technical capability of the user device 102, such as device type, screen size, screen resolution, type of operating system, application version, browser type, etc. In such an example, server 104 may request from user device 102 information relating to a technical capability of the user device 102. In the example shown in FIG. 1, the user device 102 is a smart TV having a relative large scale display and resolution. However, in another example, the user device 102 may be a smart phone having a smaller screen size, which can influence a number and/or format of thumbnails that can be shown at once during a viewing session. Additionally or alternatively, a contextual parameter may relate to a characteristic of user 110. For example, control circuitry may access a user profile to determine the user's age, gender, location, language preference, viewing history, search history, interaction history, purchasing history, and/or a preference for a type of content (including genre, content length, playback mode, accessibility settings, etc.). In some examples, a contextual parameter may relate to a user's viewing pattern. For example, control circuitry may access a user profile to determine a type of content that a user typically selects. For example, one user may typically select a thumbnail depicting an action scene in a movie, while another user may tend to selecting a romantic scene. In other examples, a user may have a preference for selecting thumbnails having fewer adornments (e.g., inserted display elements) than other thumbnails.

Additionally or alternatively, a contextual parameter may relate to a variance between visual characteristics of a current display of interface 120. For example, control circuitry of user device 102 and/or server 104 may be configured to determine an overall visual output of interface 120, e.g., accounting for a variation in various factors, such as types of color, color distribution, number of thumbnails, thumbnail distribution, type of content depicted in various thumbnails, etc. For example, control circuitry may be configured to determine that the interface 120 is currently displaying four large-scaled thumbnails, arranged in a grid pattern (as opposed to a list format). As such, a visual characteristic of one thumbnail may be compared to one or more adjacent thumbnails, e.g., for variance in color, visual intensity, and/or any appropriate visual characteristic.

Additionally or alternatively, a contextual parameter may relate to one or more factors influencing the perception and/or selection of a thumbnail on a screen of user device 102. For example, a contextual parameter may relate to a time of day, a date, and/or a condition of a viewing environment, e.g., an amount of light, the weather, etc. Additionally or alternatively, a contextual parameter may relate to a manner in which a user is operating user interface 120, e.g., scrolling rate, direction, etc. For example, control circuitry of user device 102 may be configured to determine how a user is navigating content on user interface 120, such as whether a user typically selects a highlighted thumbnail, e.g., representing a sponsored content item, from a selection of thumbnails, and/or whether a user typically navigates to a particular subsection, e.g., genre, of media content. Additionally or alternatively, control circuitry may be configured to determine a level of distraction in a viewing environment of the current viewing session, e.g., to account for a level of attention that a user is able to give to the user interface 120. For example, a user may be browsing content on a mobile device, e.g., while travelling in a public environment. As such, the user may not be able to give full attention to the user interface. In such a circumstance, a user may tend to select one type of thumbnail over another type, e.g., a large thumbnail having a low visual intensity (less cluttered) over a smaller thumbnail having a higher visual intensity (more cluttered).

At 308, control circuitry, e.g., control circuitry of server 104, selects a thumbnail asset and/or a display element for use in generating a thumbnail for display on user interface 120, based on the metadata determined at 304 and the one or more contextual parameters determined at 306. In one example, user interface 120 may initially display multiple stock thumbnails 118 during a current viewing session. In response to determining a contextual parameter relating the current viewing session, control circuitry may access metadata 116 and select a thumbnail asset 112 and/or a display element 114 corresponding to the contextual parameter. Once selected, control circuitry may update a stock thumbnail 118 using the thumbnail asset 112 and/or a display element 114. In the example shown in FIG. 1, control circuitry selects thumbnail assets 112-1 and display element 114-A for use in generating thumbnail 101. For example, when the current viewing session involves user 110 browsing thumbnails representing action movies on a program guide, the contextual parameter may indicate that a general color variance across the thumbnails does not include a high level of green, e.g., compared to levels of red and black. Based on this, for a selected stock thumbnail 118 for one of the action movies, control circuitry selects a display element 114, e.g., display element 114-1, comprising the title of the movie in a green font, e.g., based on the metadata 116 stored on database 106. Control circuitry then causes the display element 114-1 to be inserted into the stock thumbnail 118, thereby generating updated thumbnail 101, e.g., in real time as user 110 browses the content on the program guide. Further to this, at a later time during the current viewing session, should control circuitry determine a change in the general color variance across the thumbnails, e.g., to now include a comparable level of green, a new display element 114, e.g., display element 114-B, comprising the title of the movie in a pink font may be selected for insertion into thumbnail 101. In this manner, thumbnail 101 is highlighted for selection in a dynamic manner as the user 110 scrolls though the content, e.g., in response to a change in the context relating to how thumbnail 101 is perceived on user interface 120. Such a change in the display output of the user interface 120 can affect a click-through rate associated with thumbnail 101, which can impact in an overall performance level of system 100.

In another example, the contextual parameter may relate to a user preference for newly released movies and a particular actor. Based on this, control circuitry may determine that one of the movies on the program guide is a new release and has that actor listed in the cast, e.g., by comparing metadata of the movie to the user preference. Based on identifying the movie as of potential interest, control circuitry may select a thumbnail asset 112, e.g., thumbnail asset 112-1, showing the preferred actor in a key frame of the movie, and a display element 114, e.g., display element 114-A, comprising a text box having the words "New Release!". Control circuitry may then cause a stock thumbnail for that movie to be updated to display thumbnail asset 112-1 as a background image and the display element 114-A as a foreground image, thus forming thumbnail 101. In this manner, a stock thumbnail 118 may be updated, e.g., in real time, during the current viewing session, e.g., to account for a preference of a user. Further to this, as a user continues to scroll through content, one or more other stock thumbnails

118 may be updated based on a determined change in one or more contextual parameters relating to the display output of the user interface 120.

The actions or descriptions of FIG. 3 may be done in any suitable alternative orders or in parallel to further the purposes of this disclosure.

Figure 4:
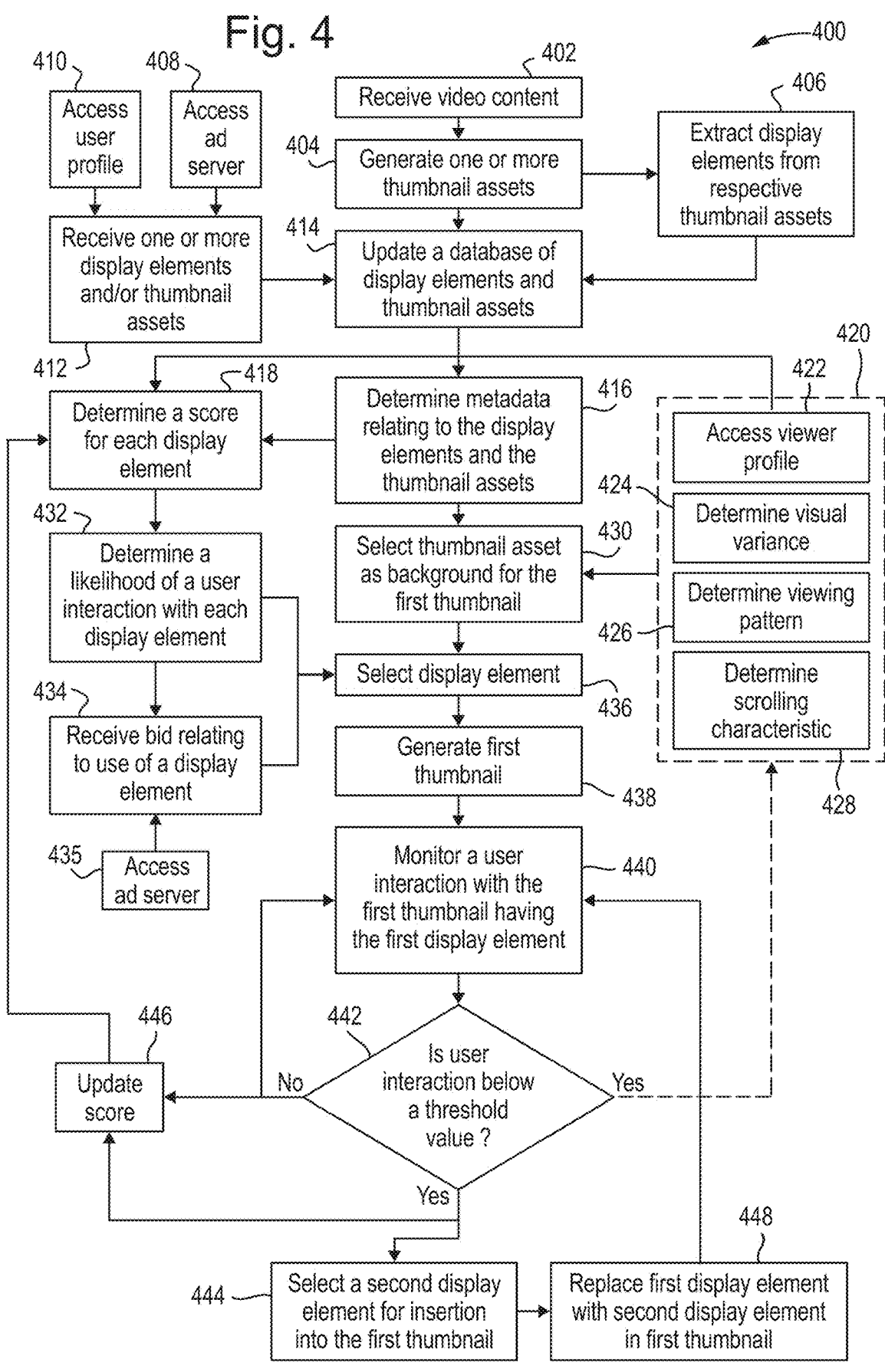
FIG. 4 is a flowchart representing a process for generating a thumbnail, in accordance with some examples of the disclosure.
Figure 5A:
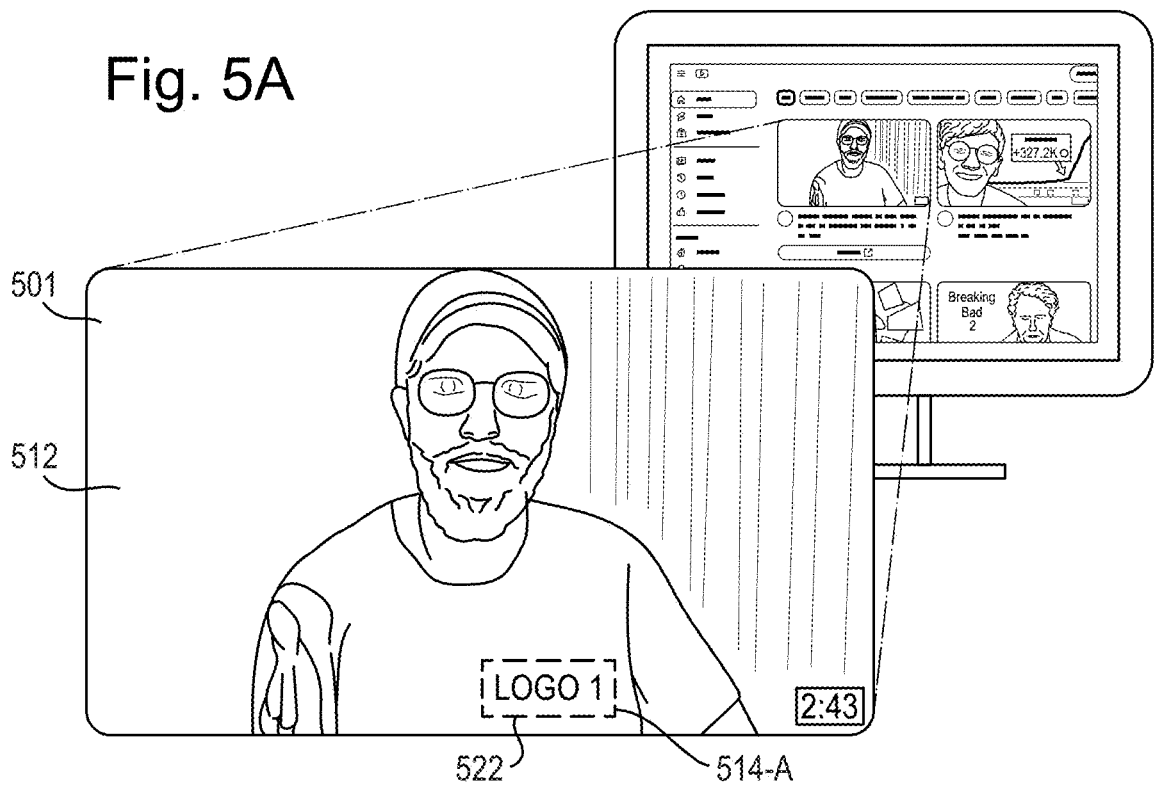
FIGS. 5A and 5B illustrate an example of generating a thumbnail during a current viewing session, in accordance with some examples of the disclosure.
Figure 5B:
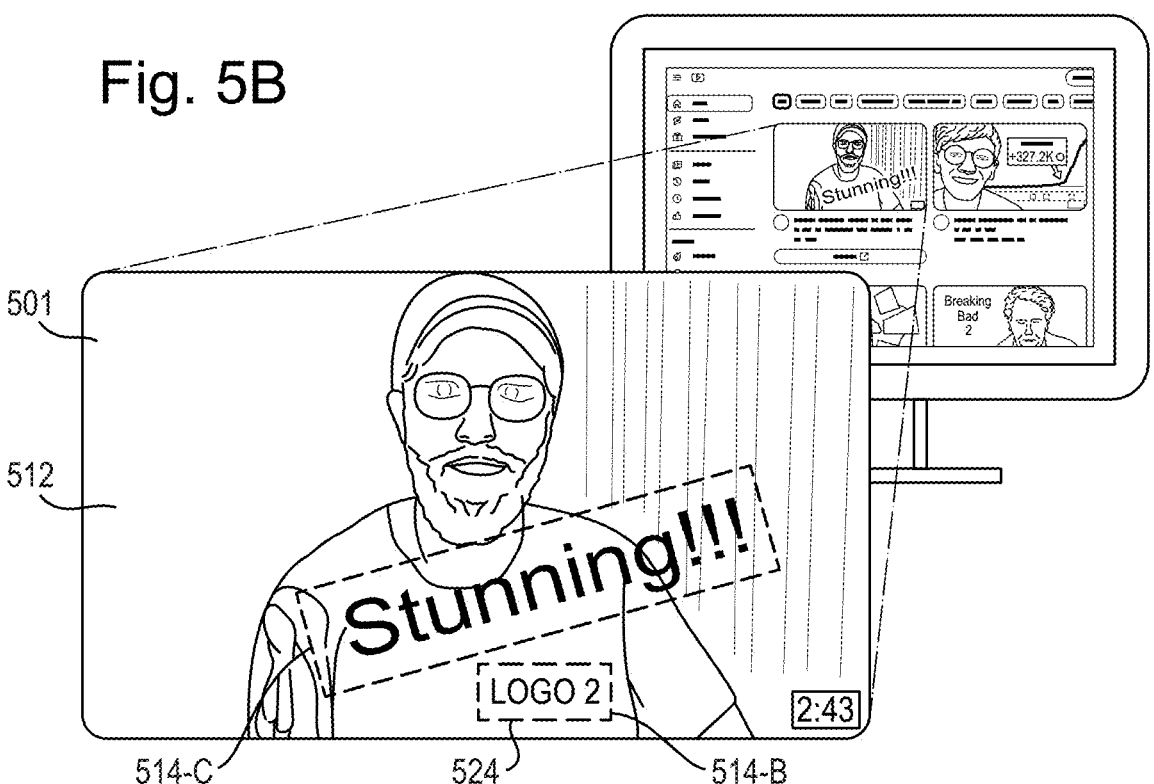
Figure 6A:
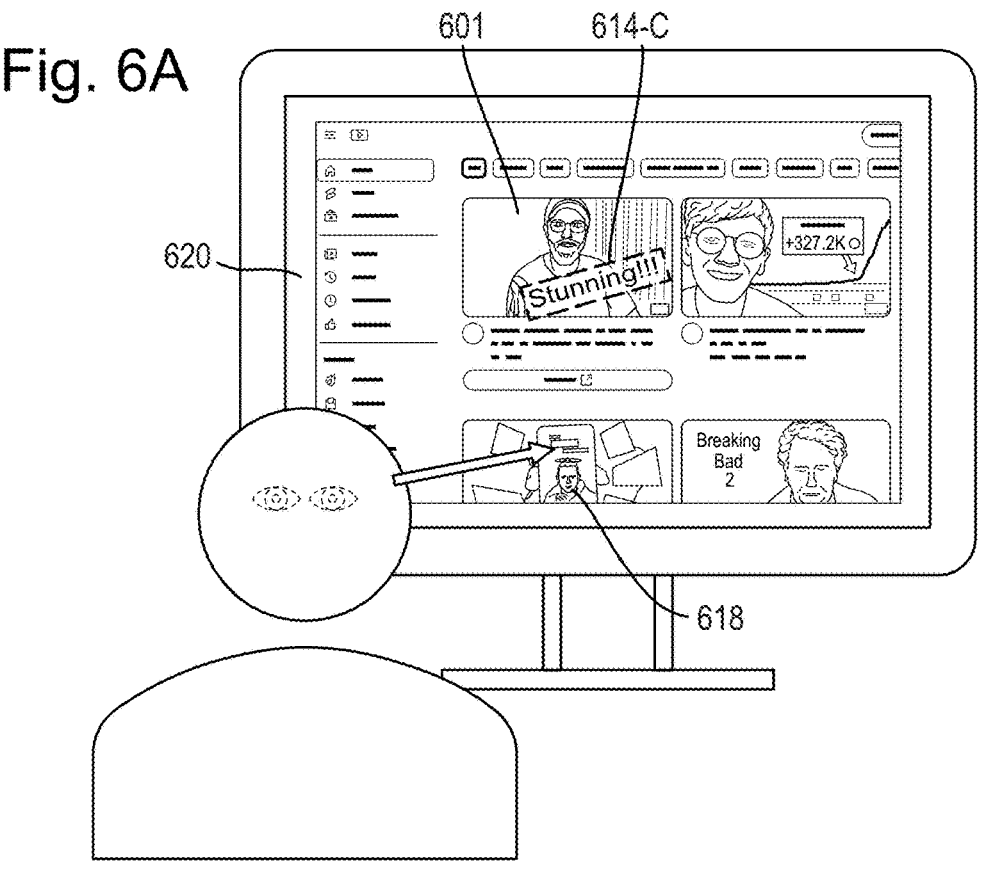
FIGS. 6A to 6C illustrate a current viewing session implementing a generated thumbnail, in accordance with some examples of the disclosure.
Figure 6B:
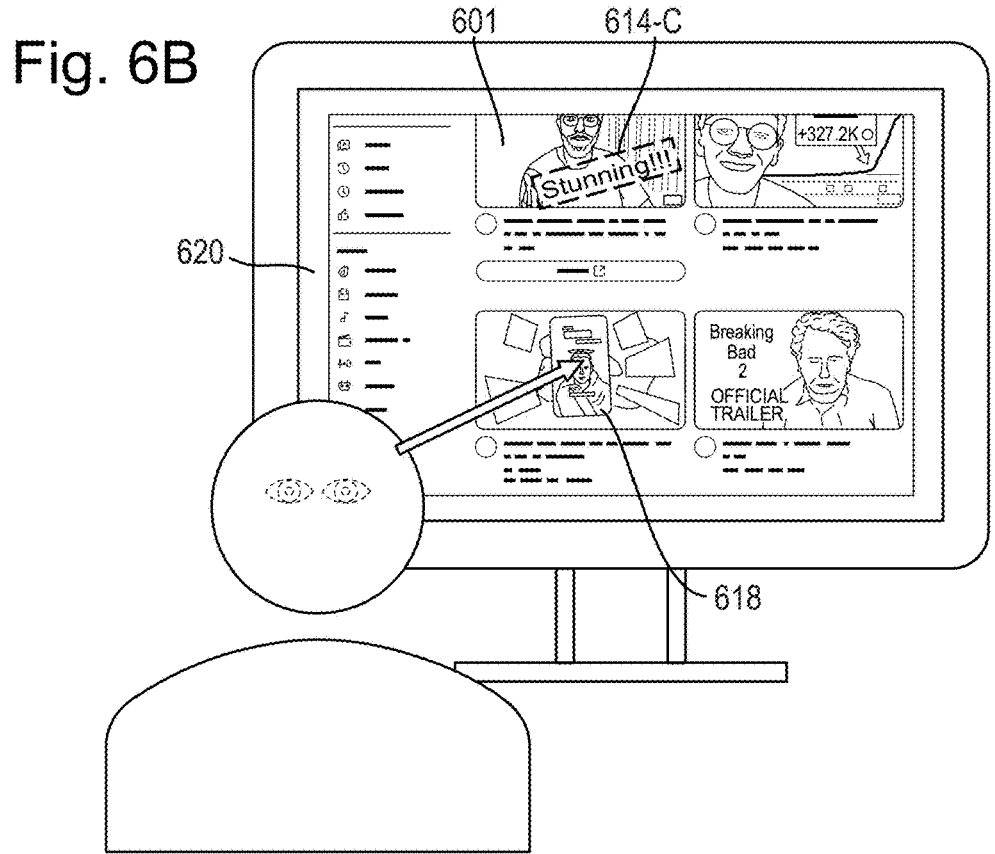
Figure 6C:
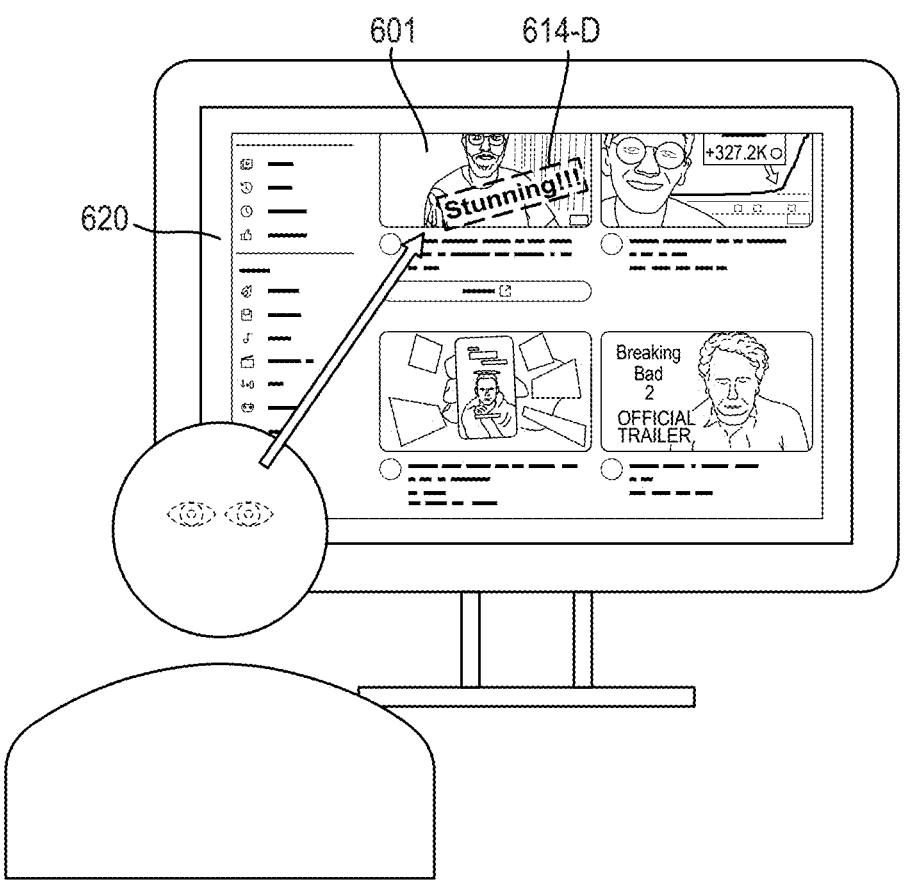

FIG. 4 shows a flowchart representing an illustrative process 400 for generating a thumbnail. While the example shown in FIG. 4 refers to the use of system 100, as shown in FIG. 1, it will be appreciated that the illustrative process 400 shown in FIG. 4 may be implemented, in whole or in part, on system 100, system 200, and/or any other appropriately configured system architecture. For the avoidance of doubt, the term "control circuitry" used in the below description applies broadly to the control circuitry outlined above with reference to FIG. 1 and/or FIG. 2. For example, control circuitry may comprise control circuitry of user device 102 and control circuitry of server 104, working either alone or in some combination. FIGS. 5A and 5B illustrate an example of modifying a thumbnail, FIGS. 6A to 6C illustrate a current viewing session implementing a generated thumbnail.

At 402, control circuitry, e.g., control circuitry of server 104, receives video content. For example, server 104 may be a server for hosting UGC that receives content from a user device, e.g., when a user (different from user 110) wishes to share content that they have created. The following examples will maintain the context of thumbnail generation for a UGC sharing platform, for ease of understanding. However, the disclosure is not limited to such an example and it is to be understood that the systems and methods disclosed herein are applicable to any scenario where a thumbnail might be generated, where technically possible. For example, the systems and methods disclosed herein are equally applicable to the generation of a thumbnail for any audio or video asset, e.g., that is made available over a content distribution network, such as a movie, a TV show, a video game, a song, an album, a presentation deck, a webinar, etc.

At 404, control circuitry, e.g., control circuitry of server 104, generates (or otherwise retrieves) one or more thumbnail assets 112 for the video content. For example, control circuitry may implement any of the analytical techniques described at 302, e.g., to identify one or more key frames of the video asset for use as a thumbnail asset. For example, the received video may comprise or be associated with metadata created by the content creator, the metadata indicating which frames of the video are tagged for selection as a thumbnail asset 112. In some examples, the metadata may include one or more instructions relating to the retrieval of a thumbnail asset, e.g., that is associated with another media content item and/or content provider.

At 406, control circuitry, e.g., control circuitry of server 104, extracts one or more display elements 114 from at least one of the thumbnail assets 112, e.g., using one or more image segmentation techniques and/or inpainting techniques. For example, a thumbnail asset 112 may comprise an extracted frame of a video asset, the frame comprising an individual wearing a branded T-shirt, as shown in thumbnail 501 of FIGS. 5A and 5B. Using this example, control circuitry may be configured to extract the logo 522, e.g., "LOGO 1", from the T-shirt, and store the extracted logo 522 as a display element 114. Additionally or alternatively, control circuitry may be configured to generate a display element 114 based on the extracted logo 522. For example, control circuitry may analyze the logo 522 to determine that it is a logo of a sports brand, e.g., using one or more image recognition techniques. Based on this analysis, control circuitry may request, for use in generating thumbnail 501, one or more display elements 114, based on the identified sports brand logo. For example, control circuitry may access an ad server, at 408, and request use of one or more ads relating to or contrasting the identified sports brand, e.g., based on a user preference retrieved from a user profile of user 110, at 410. The ad server may supply a logo 524, e.g., "LOGO 2" for use in generating, e.g., updating, thumbnail 501, according to the user preference. The engagement with the ad server is discussed below in more detail at 434 and 438, and the replacement of logo 522 with logo 524 is discussed below in more detail at 436 and 438.

At 412, control circuitry, e.g., control circuitry of server 104, receives, e.g., obtains, one or more display elements 114 and/or thumbnail assets 112, e.g., in a manner similar to that set out in 302 of process 300. For example, a creator of the UGC may upload any desired display elements 114 and/or thumbnail assets 112 to server 104 for use in generating a thumbnail. Additionally or alternatively, one or more display elements 114 and/or thumbnail assets 112 may be received in response to the steps outlined under 406 to 410. In some examples, a display element 144 may be received at 412, the display element 114 being specifically generated to obscure (e.g., cover up) a portion of a thumbnail asset 112, e.g., a display element extracted at 406. For example, control circuitry may implement an inpainting method to create a new display element 114 that blends into a thumbnail asset 112 to obscure a portion of the thumbnail asset 112. For example, it may be desirable in some circumstances to obscure an object and/or an individual from a thumbnail asset 112, e.g., based on a contextual parameter, such as a licensing restriction and/or a user preference. Additionally or alternatively, at 404, control circuitry may generate a modified thumbnail asset 112 based on a display element 114 extracted at 406. For example, control circuitry may identify a display element for removal from a thumbnail asset 112. In response to this, control circuitry may implement an inpainting technique to generate a modified thumbnail asset 112 not showing the identified display element. For example, a modified thumbnail asset 112 may be generated to remove an unwanted object or an actor from a frame extracted from the received video.

At 414, control circuitry, e.g., control circuitry of server 104, updates (or creates) a database of the received/generated display elements 114 and thumbnail assets 112, e.g., in a manner similar to that set out in 302 of process 300. For example, control circuitry may be configured to generate a database for each video content item received at 402. In some examples, control circuitry may be configured to automatically populate a database relating to the video content upon upload of the video content to server 104. In some examples, control circuitry may manage a general database of display elements 114 and thumbnail assets 112 for each user profile associated with an account holder accessing the platform for hosting the UGC. In some examples, the ability to store display elements 114 and thumbnail assets 112 may be associated with a certain subscription tier associated with the account holder. For example, a higher subscription tier may grant access to a database of stock display elements 114 and thumbnail assets 112, and/or allow for the automatic generation of display elements 114 and thumbnail assets 112 based on the received video, e.g., at 404 and 406. For example, a higher subscription tier may provide for the automatic generation, e.g., population of, a database with display elements 114 and thumbnail assets 112, related to the uploaded video.

Whereas a lower subscription tier may provide for the manual upload of display elements 114 and thumbnail assets 112 by a content generator.

At 416, control circuitry, e.g., control circuitry of server 104, determines metadata 116 relating to the display elements 114 and the thumbnail assets 112 stored in database 106 at 414, e.g., in a manner similar to that described under 304 of process 300. For example, the metadata 116 may be manually added by a user and/or automatically added, generated, or updated by control circuitry, e.g., based on other metadata associated with the received video content and/or an output of a visual analysis of the video content, a thumbnail asset 112 and/or a display element 114. Following the determination of the metadata 116, process 400 moves to 418 and 430.

At 430, control circuitry, e.g., control circuitry of server 104, selects a thumbnail asset 112, e.g., 112-1, as a background for thumbnail 101, e.g., in a manner similar to that described under 308 of process 300. In the example shown in FIGS. 5A to 6C, control circuitry selects a key frame of the received video, showing an individual wearing a cap and glasses, and a branded T-shirt having logo 522, e.g., "LOGO 1". Based on the above scoring, which accounts for the selected thumbnail asset 112, control circuitry may select a predetermined number of candidates for consideration for insertion into thumbnail 101, e.g., a predetermined number of top-scoring display elements 114. In the example shown in FIG. 4, control circuitry selects a thumbnail asset 112 based on a contextual parameter determined at 420, which comprises accessing, at 422, a viewer profile of user 110, determining, at 424, a visual variance of an interface, e.g., interface 120, determining, at 426, a viewing patter of user 110, and determining, at 428, a scrolling characteristic relating to the operation of interface 120 by user 110. However, determining a contextual parameter at 420 may include determining any appropriate type of parameter that could affect the consumption of a display element 114 displayed on a user interface, e.g., in a manner described under 306 of process 300.

At 418, control circuitry, e.g., control circuitry of server 104, determines a score for each display element 114. For example, control circuitry determines, at 422, a setting in a viewer profile for user 110 and compares the setting to metadata for the display element 114 to generate a score for the display element 114. For example, control circuitry may determine a level of similarity between the user profile setting and metadata for the display element 114. A higher level of similarity, e.g., association, correlation or correspondence, between the user profile setting and metadata for the display element 114 results in a higher score.

In some examples, control circuitry accesses the viewer profile of user 110 at 422 to determine one or more characteristics relating to the user 110 and the viewing of interface 120 during the current viewing session. For example, control circuitry may determine, based on the viewer profile, that the user 110 is of a certain gender and demographic, and the current viewing session is occurring on a smart TV at a certain time/date and in a certain location. Control circuitry may then compare this information to the metadata 116 for the display elements 114 stored in database 106 to score the display elements 114 compared to how well they match the information relating to the current viewing session. In some examples, the metadata 116 may comprise an indication of a target viewer and/or circumstance relating to the current viewing session. For example, a display element 114 may be tagged as a display element 114 intended for consumption by a female user during a viewing session on a smart TV on a weekday evening. Should the current viewing session match those parameters, that display element 114 will be scored highly. Thus, it can be seen that the scoring of the display element 114 is dynamic, e.g., the score of each display element 114 may vary according to the details of the current viewing session, e.g., when, where, who, how, etc.

In some examples, multiple display elements 114 may be grouped and a combined score generated. Additionally or alternatively, a score of a display element 114 may be dependent on one or more characteristics of a thumbnail asset 112. For example, control circuitry may base the score of the display element 114 on a characteristic of a thumbnail asset 112 into which it could be potentially inserted. In one case, a display element 114 might score highly for use with one thumbnail asset 112, e.g., 112-1, but score lower for use with another thumbnail asset 112, e.g., 112-2. In some examples, a combined score of a display element 114 (or group of display elements 114) and a thumbnail asset 112 may be generated. In the example shown in FIG. 4, 418 moves to 432. However, in some examples, 418 may move to 436, where a display element would be selected based on the determined score.

At 432, control circuitry, e.g., control circuitry of server 104, determines a likelihood of a user interaction with one or more display elements 114, e.g., those top-ranked display elements 114. For example, control circuitry may analyse, e.g., through a trained machine learning model, a user interaction pattern, e.g., across multiple historic user interactions of other users, to evaluate the click-through probability associated with a display element 114. For example, control circuitry may access historic data indicating a click-through rate associated with a previously used display element, e.g., which is similar to or the same as a display element 114. In this manner, system 440 gains an understand of a likelihood of a user interacting with a display element 114, should it be selected for use in a thumbnail. For example, a top-scored display element 114, e.g., based on analysis of the viewer's profile, may be associated with a low likelihood of a user interaction, or vice versa. Following identification of the top-scored display elements 114 having a high likelihood of user interaction, process 300 moves to 434 and 436. In some examples, the likelihood of a user interaction may be based on a contextual parameter, e.g., determined at 420. For example, the likelihood of a user interaction may be based on how the user is interacting with interface 120 during the current viewing session, which accounts for a level of complexity above looking a setting in the user's profile. For example, the characteristics or parameters associated with one viewing session may be different from the characteristics or parameters associated with another, e.g., later, viewing session, e.g., by virtue of a type of user device 102 being used to generate interface 120. Thus, it can be seen that the probability of user interaction may be a dynamic factor, in a similar manner to the score. In the example shown in FIG. 4, 432 follows from 418. However, in some examples, an output from 432 may occur before or without determining a score at 418.

At 434, control circuitry, e.g., control circuitry of server 104, determines whether there is bid relating to use of a display element 114. For example, control circuitry may access ad server, at 435, an request a bid relating to a display element 114. For example, one or more of the display elements 114 received at 412 may have been received from an ad server, accessed at 408. For example, control circuitry may receive, at 434, a bid relating to use of logo 524, e.g., "LOGO 2" shown in FIG. 5B. In some examples, control circuitry of server 104 may communicate the output of 418 and/or 432 with an ad server. In this manner, an ad server may gain an understanding of how likely user 110 is to interact with a thumbnail containing one of their display elements 114. For example, where user 110 exhibits a stronger preference for a sports brand represented by "LOGO 2" over a sports brand represented by "LOGO 1", and "LOGO 2" demonstrates a relatively high likelihood of a user interaction (once inserted into a thumbnail), the ad server may submit a bid for selection of a display element, 514-A, representing "LOGO 2" in the generation of a thumbnail. In the example shown in FIGS. 5A and 5B, the bid is a bid to replace an existing display element 114 present in thumbnail asset 512-1, e.g., display element 514-A. However, In some examples, the bid may relate to the inclusion of a display element 114 more generally, e.g., at any appropriate location in a thumbnail.

At 436, control circuitry, e.g., control circuitry of server 104, selects one or more display elements 114 for use in generating a thumbnail. In the example shown in FIGS. 5A and 5B, control circuitry selects a display element representing "LOGO 2", e.g., display element 514-B for use in generating thumbnail 101 replacing display element 514-A.

In some examples, 432 may move directly to 436, e.g., without requesting a bid from an ad server. For the avoidance of doubt, the sequence illustrated in FIG. 4 by 432-434-436 may occur in addition to or independently from 432-436, and it is to be understood that process 400 does not rely on communication with an ad server for its implementation, and any the depiction of display element 114 as a logo is purely for the sake of example. For example, in addition to or instead of selecting display element 514-B, control circuitry selects display element 514-C, showing the text "Stunning!" in bold, white text.

At 438, control circuitry, e.g., control circuitry of server 104, generates a thumbnail. In the example shown in FIG. 5B, control circuitry inserts or overlays display elements 514-B and 514-C onto thumbnail asset 512-1, thereby defining thumbnail 501. The generated thumbnail 501 is then presented during the current viewing session.

At 440, control circuitry, e.g., control circuitry of user device 102 and/or server 104, monitors a user interaction with a thumbnail, e.g., one or more display elements 114 of thumbnail 101. In the example shown in FIGS. 6A and 6B, control circuitry is monitoring the interaction of user 610 operating interface 620, which is displaying a selection of thumbnails 601, 618 on a UGC sharing platform. For example, control circuitry may be configured to determine whether user 610 has indicated any interest in thumbnail 601, e.g., by virtue of movement of a cursor or gesture towards thumbnail 601. For example, control circuitry may be configured to determine movement and/or hovering of a cursor over thumbnail 601. Additionally or alternatively, control circuitry may be configured to track a position of thumbnail 601 on interface 620, e.g., to indicate how prominent thumbnail 601 is being displayed on interface 620 (e.g., centrally located or locater towards an edge, and/or fully displayed versus partially displayed). Additionally or alternatively, control circuitry may be configured to determine whether user 610 is scrolling content on the interface 620, and, if so, whether user 610 has stopped scrolling with thumbnail 601 in a prominent position (e.g., towards the center or top of the interface 620). Additionally or alternatively, control circuitry may be configured to track a gaze of user 610, e.g., in combination with a known position of thumbnail 601 on the interface, to determine whether user 620 is looking at thumbnail 601. In the example shown in FIGS. 6A to 6C, user 610 is scrolling down through the content on interface 620 (shown by the change in position of thumbnails 601 and 618 on the interface between FIGS. 6A and 6B). Control circuitry of user device 602 is configured to determine the positions and visibility of the thumbnails 601 and 618 on a screen displaying the interface. In addition, control circuitry of user device 602 determines a gaze direction of user 610. For example, in FIG. 6A, thumbnail 601 is in a prominent position (at the top left of the interface 620) and user 610 is looking at the bottom left of the interface 620, e.g., in a direction associated with the position of thumbnail 618, 628. In FIG. 6B, thumbnail 601 is in a less prominent position (partially off the top left of the interface 620) and user 610 is still looking at the bottom left of the interface 620, e.g., in a direction associated with the position of thumbnail 618, 628. Based on this, control circuitry may determine a low level of user interaction, e.g., interest, in thumbnail 601, e.g., compared to thumbnail 628.

At 422, control circuitry, e.g., control circuitry of user device 102 and/or server 104, determine whether the level of user interaction is below a predetermined interaction level, e.g., a threshold value for user interaction. For example, the predetermined interaction level may be set at a level indicating that a user does not look at a thumbnail. In other examples, the level may be based on multiple parameters, e.g., a user may initially show interest in thumbnail 601 by looking at it for a certain period, but then change to looking at another thumbnail 618 and continue scrolling. In the example shown in FIGS. 6A to 6C, the level of interaction is below the predetermined interaction level, since user 620 did not look at thumbnail 601 while scrolling. As such, process 400 moves to 444 (or optionally returns to 420 to regenerate the entire thumbnail 601). However, should the level of interaction be above the predetermined interaction level, process 400 moves to back to 440 to continue to monitor the user interaction level. Irrespective of the output of 422, process 400 moves from 422 to 446 to update a score associated with the display elements 514-B and 514-C. In this manner, a feedback mechanism is implemented to create an improved scoring method for scoring the display elements at 418, which can help control the management and/or storage of metadata 116. In some examples, the output of 442 may be utilized by a neural network to model the scores for the display elements, to more accurately predict the likelihood of a user interaction with a display element, e.g., at 432.

At 444, control circuitry, e.g., control circuitry of server 104, selects another display element (e.g., a second display element), for insertion into thumbnail 601. For example, control circuitry may select a differently scored display element to display in thumbnail 601, e.g., in replacement of a display element selected at 436. In the example shown in FIG. 6C, control circuitry selects display element 614-D comprising a differently colored version of the text "Stunning!", e.g., based on a contextual parameter of the interface. In some examples, an output from 420 and/or 432 may feed into 444 when selecting a new display element to display in thumbnail 601. However, the selection of the new display element may occur at 436. For example, control circuitry may be configure to pre-select a secondary display element, should a level of user interaction associated with a primary display element be below the predetermined interaction level. In some examples, 444 may output to 446, e.g., to update a score associated with display element 614-D. For example, the score associated with display element 614-D may be updated to ensure that display element 614-D is selected over display element 614-C in a subsequent viewing session, e.g., based on a poor performance of display element 614-C in producing interaction with thumbnail 601.

At 448, control circuitry, e.g., control circuitry of server 104, replaces one display element with another display element. In the example shown in FIG. 6C, control circuitry replaces display element 614-C, which comprises the text "Stunning!" in bold, white text, with the display element 614-D, which comprises the text "Stunning!" in bold, yellow text. For example, yellow text may be chosen based on a relative lack of the color yellow at a particular instance in the current viewing session, while such a modification is subtle, it causes user 620 to change their gaze towards thumbnail 601. In some examples, the change may be less subtle, and the example of a color change is used to ease the understanding of the disclosure. For example, control circuitry may cause display element 614-C to be replaced by an animated display element, e.g., that flashes or continually changes color. Process 400 then moves back to 440 to continue to monitor the level of user interaction.

In some examples, control circuitry may be configured to update a thumbnail different from the thumbnail 101, 501, 601, e.g., using any of the steps outlined above, either alone or in combination. For example, a thumbnail that is included on a portion of an interface (e.g., of a webpage or program guide) that has not yet been viewed by a user (e.g., by virtue if it being off a viewable area of a screen displaying the interface) may be updated before being displayed to the user. In some examples, a step of updating a thumbnail that has yet to be viewed during a current viewing session may be performed based on a level of user interaction with one or more viewable thumbnails, e.g., the first thumbnail 101 and/or one or more other thumbnails 118, being below a threshold value such as that determined at 442. In some examples, such a step may be performed without reloading or refreshing the interface, e.g., via the use of an XMLHtt-pRequest (XHR) for a webpage or any other appropriate means for carrying out a background processing operation. In this manner, yet to be viewed thumbnails may be updated in time for when they become viewable during a current viewing session, e.g., by virtue of a user scrolling or browsing content on an interface.

Process 400, as outlined in FIG. 4, provides an improved method for the generation of a thumbnail, e.g., by dynamically updating a thumbnail to illicit user selection of the thumbnail, thereby controlling a click-through rate associated with the generated thumbnail. Such control can help manage the operational processes associated with the running of system 100, e.g., server 104.

The actions or descriptions of FIG. 4 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating a thumbnail associated with a media asset, the method comprising:

storing, using control circuitry, one or more display elements in a database for use in a first thumbnail associated with the media asset;

determining, using control circuitry, metadata relating to the display elements in the database;

determining, using control circuitry, a contextual parameter relating to a current viewing session, wherein the contextual parameter comprises at least one of (i) a variance in a visual characteristic of one or more second thumbnails adjacent to the first thumbnail, (ii) a gaze of a user participating in the current viewing session, or (iii) a scrolling characteristic relating to the current viewing session of the first thumbnail;

selecting, using control circuitry, a first display element for use in generating the first thumbnail based at least in part on the metadata and the contextual parameter;

causing, using control circuitry, the first thumbnail comprising the first display element to be displayed at a user device;

monitoring a user interaction with the first thumbnail having the first display element; and selecting a second display element for insertion into the first thumbnail based at least in part on the user interaction.

2. The method of claim 1, the method comprising:

determining a score for each display element stored in the database based on the metadata and the contextual parameter; and selecting the first display element based on the determined score.

3. The method of claim 2, the method comprising:

monitoring a user interaction with the first thumbnail having the first display element; and updating the score for each display element based on the user interaction.

4. The method of claim 1, the method comprising:

replacing the first display element with the second display element during the current viewing session.

5. The method of claim 1, the method comprising:

selecting the second display element during a subsequent viewing session instead of the first display element.

6. The method of claim 1, the method comprising:

receiving a bid relating to insertion of the first display element; and selecting the first display element based on the bid.

7. The method of claim 1, the method comprising:

receiving the media asset;

analyzing the media asset to generate one or more thumbnail assets; and selecting one of the thumbnail assets for use in the first thumbnail.

8. The method of claim 1, the method comprising:

receiving multiple thumbnail assets each having associated metadata; and extracting one or more display elements from respective thumbnail assets, wherein each display element retains an association with the metadata associated with the thumbnail assets from which it was extracted.

9. A system for generating a thumbnail, the system comprising control circuitry configured to:

store one or more display elements in a database for use in a first thumbnail associated with the media asset;

determine metadata relating to the display elements in the database;

determine a contextual parameter relating to a current viewing session, wherein the contextual parameter comprises at least one of (i) a variance in a visual characteristic of one or more second thumbnails adjacent to the first thumbnail, (ii) a gaze of a user participating in the current viewing session, or (iii) a scrolling characteristic relating to the current viewing session of the first thumbnail;

select a first display element for use in generating the first thumbnail based at least in part on the metadata and the contextual parameter;

cause the first thumbnail comprising the first display element to be displayed at a user device;

monitor a user interaction with the first thumbnail having the first display element; and select a second display element for insertion into the first thumbnail based at least in part on the user interaction.

10. The system of claim 9, wherein the control circuitry is configured to:

determine a score for each display element stored in the database based on the metadata and the contextual parameter; and select the first display element based on the determined score.

11. The system of claim 10, wherein the control circuitry is configured to:

monitor a user interaction with the first thumbnail having the first display element; and update the score for each display element based on the user interaction.

12. The system of claim 9, wherein the control circuitry is configured to:

replace the first display element with the second display element during the current viewing session.

13. The system of claim 9, wherein the control circuitry is configured to:

select the second display element during a subsequent viewing session instead of the first display element.

14. The system of claim 9, wherein the control circuitry is configured to:

receive a bid relating to insertion of the first display element; and select the first display element based on the bid.

15. The system of claim 9, wherein the control circuitry is configured to:

receive the media asset;

analyze the media asset to generate one or more thumbnail assets; and select one of the thumbnail assets for use in the first thumbnail.

16. The system of claim 9, wherein the control circuitry is configured to:

receive multiple thumbnail assets each having associated metadata; and extract one or more display elements from respective thumbnail assets, wherein each display element retains an association with the metadata associated with the thumbnail assets from which it was extracted.

\* \* \* \* \*